UNITED STATES PATENT OFFICE.

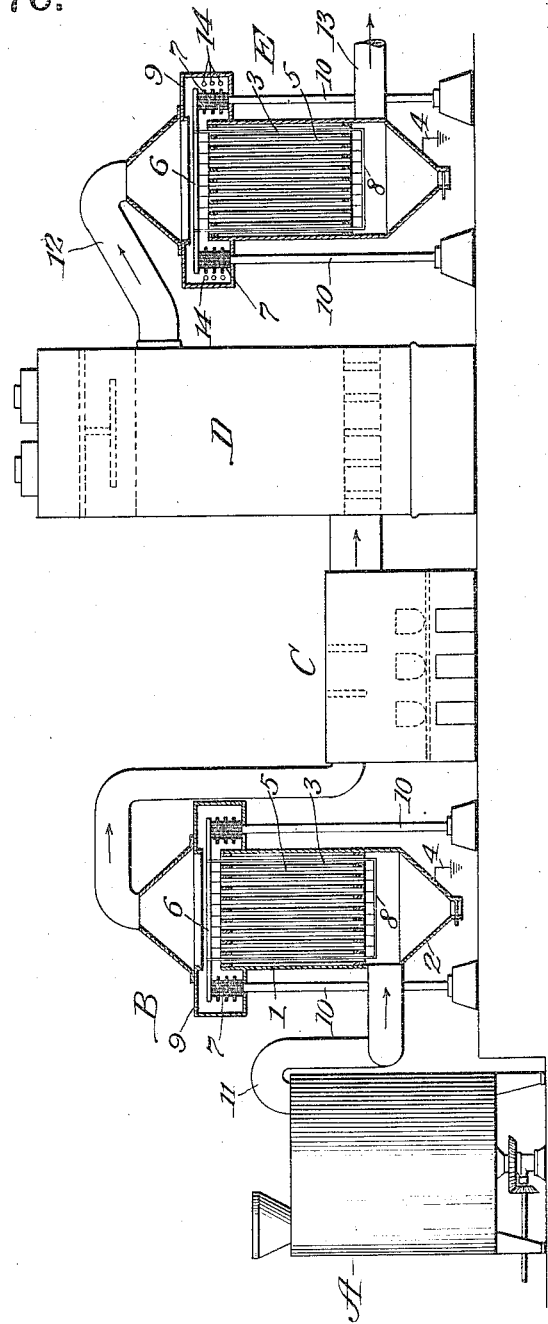

LINN BRADLEY, OF EAST ORANGE, NEW JERSEY, ASSIGNOR TO RESEARCH CORPORATION, OF NEW YORK, N. Y., A CORPORATION OF NEW YORK.

SULFURIC-ACID MANUFACTURE.

1,284,176.

Specification of Letters Patent.   Patented Nov. 5, 1918.

Original application filed February 24, 1917, Serial No. 150,797. Divided and this application filed August 25, 1917. Serial No. 188,156.

*To all whom it may concern:*

Be it known that I, LINN BRADLEY, a citizen of the United States, residing at East Orange, in the county of Essex and State of New Jersey, have invented certain new and useful Improvements in Sulfuric-Acid Manufacture, of which the following is a specification.

This invention relates to the manufacture of sulfuric acid and sulfuric anhydrid, the objects of the invention being to provide an improved process of manufacture, and an improved apparatus for use in connection with said process. The present improvements relate particularly to the purification and treatment of pyrites burner gases, or of similar gaseous mixtures containing sulfur dioxid. According to my invention the burner gases, while at a temperature above the point at which any substantial condensation of sulfuric acid can take place, are subjected to the action of the known apparatus for electrical precipitation. Thereby the dust, under which term I include all suspended or non-gaseous particles in the gas-stream, is rapidly deposited in a substantially dry state; while the gaseous bodies, including practically all of the sulfuric acid (which exists as a gas at the operating temperature) pass on with the main gas-stream, the sulfuric acid being recovered at a later operating stage. According to the preferred embodiment of the present invention the gases thus purified from dust are subjected to partial oxidation with cooling, for example in a Glover tower, whereby a cloud or mist of sulfuric acid and associated impurities is formed; and this cloud is then removed at a lower temperature, preferably by electrical precipitation.

I have found that the rapidity of deposition of dust from the highly heated burner gases by the known apparatus for electrical precipitation is such as to permit, with a proper arrangement of apparatus, a practically complete elimination of dust while avoiding such fall of temperature of the gas as would permit the simultaneous deposition of sulfuric acid from the mists or clouds which tend to form when such gas-streams are cooled. This permits me to modify in a highly advantageous manner, as hereinafter more fully pointed out, the present methods of manufacture of sulfuric acid.

A form of apparatus operating in accordance with my invention is illustrated in the accompanying drawings, wherein the figure is a side elevation, parts being shown in section, of certain plant elements applicable to the manufacture of chamber acid in accordance with my invention.

Referring to the figure, A represents a sulfur-dioxid generator or pyrites burner which may be of any usual or approved type, and B an electrical precipitator hereinafter more fully described. C indicates the usual niter pots and D a Glover tower, both of which may be of any approved design. E represents a second electrical precipitator, which is illustrated as of substantially the same general construction and form as the precipitator B.

As illustrated by way of example, the electrical precipitator B comprises a casing 1 which may be of iron, constructed with a converging bottom 2 for the collection and discharge of the precipitate. The collecting electrodes 3 have the form of a battery of open-ended, vertical, parallel tubes, which may be in electrical contact with the casing, the latter being suitably grounded as conventionally indicated at 4. The discharge electrodes are indicated as wires, rods or strips 5, vertically positioned and extending axially through the tubular collecting electrodes 3. The discharge electrodes are carried by transverse conductors 6 which extend horizontally above the tubes 3 and are supported by insulators 7. 8 indicates any suitable tensioning means, for example a weight or spreader, whereby the discharge electrodes are held in their axial position within the tubes. The insulators 7 are mounted in lateral extensions of the casing indicated by the numeral 9, and are therefore maintained at approximately the same temperature as the gases traversing the precipitator. In the particular form illustrated these insulators are carried by vertical posts or other appropriate supports 10, located outside of the casing 1 but extending into the extensions 9. In practice, the discharge electrodes are connected to the negative pole of a source of high electrical potential, as is now well understood in this art, the discharge between the respective electrodes serving to precipitate all suspended matters. It will be observed that the highly heated burner gases, with their burden of dust, pass directly through flue 11 into the precipitator B; and it is characteristic of my invention that the temperature within the precipitator B is maintained above the temperature at which sulfuric acid (which is always present to a greater or lesser extent in the burner gases) is deposited as a liquid. In case the temperature were permitted to fall materially below this point, the sulfuric acid would collect upon the insulators 7, quickly rendering them useless for their intended purpose. Moreover, if mists or clouds of sulfuric acid are permitted to form in the precipitator by condensation, such clouds are quickly precipitated with the dust, such precipitation resulting not only in loss of acid through neutralization by the iron oxid and other bases of the dust, but materially increasing the difficulty of removing and handling the precipitate, which may then assume the condition of a sludge. Furthermore, the substantial absence of acid in the liquid phase permits the employment in the construction of the precipitator, including the electrodes, of such inexpensive materials as cast and wrought iron, etc. Ordinarily, the location of the precipitator in immediate proximity to the burners will suffice to maintain the proper working temperature, which should preferably materially exceed 317° C. (the boiling-point of 98 per cent. sulfuric acid); but it will be understood that the precipitator or any portion thereof may if required be covered with any of the usual heat-insulating materials, or its proper working temperature may be maintained by any suitable means.

The gases are thus substantially freed from suspended impurities, and in case the sulfuric acid is to be prepared in accordance with the well-known chamber process, the gases may pass directly to the niter pots C, and thence to the usual Glover tower D and to the supplemental or low-temperature precipitator E.

Although the supplemental purification of the gases for the removal of impurities which pass the electrical precipitator B in the gaseous phase may be carried out in any desired manner, I prefer to accomplish this by interposing in the path of the partially cooled and oxidized gases escaping from the Glover tower D a second electrical precipitator E, which may be of the same type as the precipitator B, or of any other desired type, but the operating temperature of which is below that at which sulfuric acid separates as a cloud or mist. This supplemental precipitator E is illustrated as having the same general construction as the precipitator B, and like reference numerals are applied thereto, the precipitator however receiving the gases from the Glover tower at the top through flue 12, and delivering them from its lower portion through flue 13 to the chamber system. Inasmuch as this precipitator operates at temperatures below the condensing-point of sulfuric acid it should of course be constructed of materials which are not affected by sulfuric acid under the operating conditions; and the insulators should be protected by any appropriate means against loss of efficiency due to the deposition of acid thereon. This may be accomplished for example by heating the insulators locally by means of resistance elements 14, or in any other desired way.

Certain advantages which are secured through the practice of my invention have already been mentioned. The principal advantages may be briefly summarized as follows:—

(1) Since the temperature of the gas is maintained, during the deposition of the dust, above the point at which sulfuric acid can exist in the liquid phase, the insulators of the precipitator B retain their efficiency, which would not be the case were even a film of sulfuric acid deposited upon their surfaces. Condensation of acid upon the insulators is effectually prevented by locating them in the interior of the precipitator, whereby they attain substantially the temperature of the gas-stream.

(2) The dust is precipitated in a sufficiently dry state to permit easy removal and handling.

(3) The acid which would otherwise be lost through neutralization by the basic constituents of the dust is saved, and is later recovered in comparatively clean and usable form.

(4) Owing to the absence of sulfuric acid in the liquid phase the corrosion problems are eliminated so far as the precipitator B is concerned, and it becomes practicable to use in its construction sheet iron and other inexpensive materials.

(5) The bulk of the arsenic contained in the burner gases traverses the precipitator without possibility of conversion to arsine ($AsH_3$) through contact with iron in presence of aqueous acid. Thereby the subsequent removal of arsenic by supplemenal purification is greatly simplified. This subsequent purification may be carried out entirely in brick-lined flues, etc., or otherwise under conditions to avoid contact of the condensed acid with iron surfaces.

(6) A high degree of heat-conservation may be attained, inasmuch as the precipitating apparatus is relatively very small, as compared for example with a dust chamber capable of operating with any comparable degree of efficiency. Furthermore, the apparatus requires but few openings through which air may enter to dilute and cool the gas, or moisture to condense the sulfur trioxid which is always present in the burner gases. The precipitator moreover may readily be covered with suitable heat-insulation.

(7) This heat conservation is especially advantageous in the application of the invention to the chamber process, the heat of the gases being conveyed in greater measure to the Glover tower, the operating efficiency of which is thereby improved.

(8) It is found practicable, owing to the absence of dust to prepare a clean and salable niter cake in the niter pots.

It is to be understood that my invention may be carried into effect in apparatus differing widely in construction and design from that herein illustrated and described. This application is a division of my copending application Serial No. 150,797, filed February 24, 1917.

I claim:—

1. In apparatus for the manufacture of sulfuric acid, the combination with a sulfur-dioxid generator, of two electrical precipitators arranged in series in the line of the gas-flow, and means interposed between said precipitators for cooling and oxidizing the gases.

2. In apparatus for the manufacture of sulfuric acid, the combination with a sulfur-dioxid generator, of two electrical precipitators arranged in series in the line of the gas-flow, and a Glover tower interposed between said precipitators.

3. In apparatus for the manufacture of sulfuric acid, the combination with a sulfur-dioxid generator, of an electrical precipitator, and a nitrifying apparatus, both arranged in the line of flow of the gases between the generator and the chambers.

4. In apparatus for the manufacture of sulfuric acid, the combination with a Glover tower or equivalent nitrifying device, of an electrical precipitator arranged to treat the exit gases therefrom before entering the chambers.

5. In the manufacture of sulfuric acid, the steps which consist in electrically precipitating the dust from the burner gases while maintaining a sufficient temperature to avoid substantial deposition of sulfuric acid, then effecting a partial oxidation of the sulfur dioxid and cooling the gases to form a cloud or mist containing sulfuric acid and associated impurities, and removing said cloud.

6. In the manufacture of sulfuric acid, the steps which consist in electrically precipitating the dust from the burner gases while maintaining a sufficient temperature to avoid substantial deposition of sulfuric acid, then effecting a partial oxidation of the sulfur dioxid and cooling the gases to form a cloud or mist containing sulfuric acid and associated impurities, and electrically precipitating said cloud.

7. In the manufacture of sulfuric acid, the steps which consist in electrically precipitating suspended particles from a burner gas at temperatures respectively above and below the condensing point of sulfuric acid, and effecting a partial oxidation of sulfur dioxid between said precipitating operations.

8. In the manufacture of sulfuric acid, the steps which consist in burning a sulfur-bearing material to produce a gas mixture containing sulfur dioxid, effecting a partial oxidation of the sulfur dioxid component of said gas mixture with formation of a mist or cloud containing sulfuric acid and associated impurities, and electrically precipitating said cloud.

In testimony whereof I affix my signature.

LINN BRADLEY.